(12) United States Patent
Clisson

(10) Patent No.: US 9,849,338 B2
(45) Date of Patent: Dec. 26, 2017

(54) SWIMMING ASSISTANCE ACCESSORY, ESPECIALLY FOR PERFORMING A STROKE REQUIRING AN UNDULATORY MOVEMENT

(71) Applicant: Laurent Clisson, Bourg-la-Reine (FR)

(72) Inventor: Laurent Clisson, Bourg-la-Reine (FR)

( * ) Notice: Subject to any disclaimer, the term of this patent is extended or adjusted under 35 U.S.C. 154(b) by 165 days.

(21) Appl. No.: 14/646,402

(22) PCT Filed: Nov. 21, 2013

(86) PCT No.: PCT/FR2013/052819
§ 371 (c)(1),
(2) Date: May 21, 2015

(87) PCT Pub. No.: WO2014/080133
PCT Pub. Date: May 30, 2014

(65) Prior Publication Data
US 2015/0290500 A1  Oct. 15, 2015

(30) Foreign Application Priority Data
Nov. 21, 2012 (FR) ..................... 12 61087

(51) Int. Cl.
*A63B 69/12* (2006.01)
*A63B 31/10* (2006.01)
*A63B 69/14* (2006.01)
*G09B 19/00* (2006.01)

(52) U.S. Cl.
CPC .............. *A63B 31/10* (2013.01); *A63B 69/14* (2013.01); *G09B 19/0038* (2013.01); *A63B 2225/605* (2013.01)

(58) Field of Classification Search
USPC .......... 434/247, 254; 441/55, 56, 58, 80, 88; 446/153
See application file for complete search history.

(56) References Cited

U.S. PATENT DOCUMENTS

| | | | | |
|---|---|---|---|---|
| 2,593,321 A | * | 4/1952 | Lindgren | B63C 9/08 434/254 |
| 2,941,219 A | * | 6/1960 | Irving | A63B 35/06 441/56 |
| 3,203,694 A | * | 8/1965 | Kobashikawa | A63B 25/08 446/153 |
| 3,373,991 A | | 3/1968 | Smalley | |

(Continued)

FOREIGN PATENT DOCUMENTS

| | | |
|---|---|---|
| FR | 2 940 762 A1 | 7/2010 |
| GB | 2 480 368 A | 11/2011 |

OTHER PUBLICATIONS

International Search Report as issued in International Patent Application No. PCT/FR2013/052819, dated Mar. 14, 2014.

*Primary Examiner* — Kurt Fernstrom
(74) *Attorney, Agent, or Firm* — Pillsbury Winthrop Shaw Pittman LLP

(57) ABSTRACT

A swimming assistance accessory includes a holder to hold the accessory during swimming; a float allowing the water to exert, on the accessory, a vertical force resulting from buoyancy opposing gravity; and a weight allowing the barycenter of the holder to be maintained substantially below the surface of the water when the accessory is in a balance position in water.

20 Claims, 10 Drawing Sheets

(56) References Cited

U.S. PATENT DOCUMENTS

| | | | | | |
|---|---|---|---|---|---|
| 4,227,273 | A | * | 10/1980 | Lucciola | A63B 69/14 |
| | | | | | 434/254 |
| 4,240,171 | A | * | 12/1980 | Parsons | A63B 69/14 |
| | | | | | 441/56 |
| 4,518,364 | A | * | 5/1985 | Jacobson | A63B 69/14 |
| | | | | | 434/254 |
| 4,781,638 | A | * | 11/1988 | Winters, Jr. | B63B 35/73 |
| | | | | | 434/254 |
| 4,995,604 | A | * | 2/1991 | Lynch | A63B 21/0606 |
| | | | | | 434/254 |
| 5,980,259 | A | * | 11/1999 | Witmer | B63C 9/00 |
| | | | | | 434/254 |
| 6,347,971 | B1 | * | 2/2002 | Berke | A63B 35/00 |
| | | | | | 434/254 |
| 6,955,577 | B1 | * | 10/2005 | Hall | B63B 35/7906 |
| | | | | | 441/65 |
| 8,453,608 | B2 | * | 6/2013 | Lind | A01K 15/02 |
| | | | | | 119/707 |
| 9,072,955 | B2 | * | 7/2015 | King | A63B 69/14 |

* cited by examiner

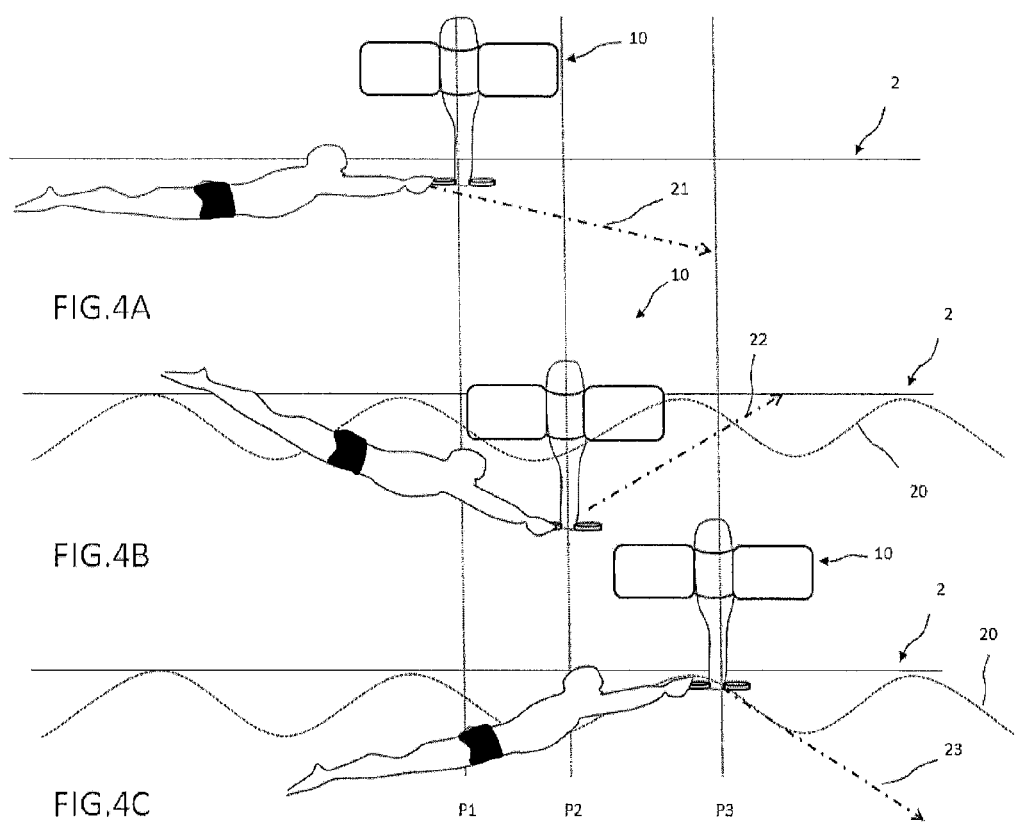

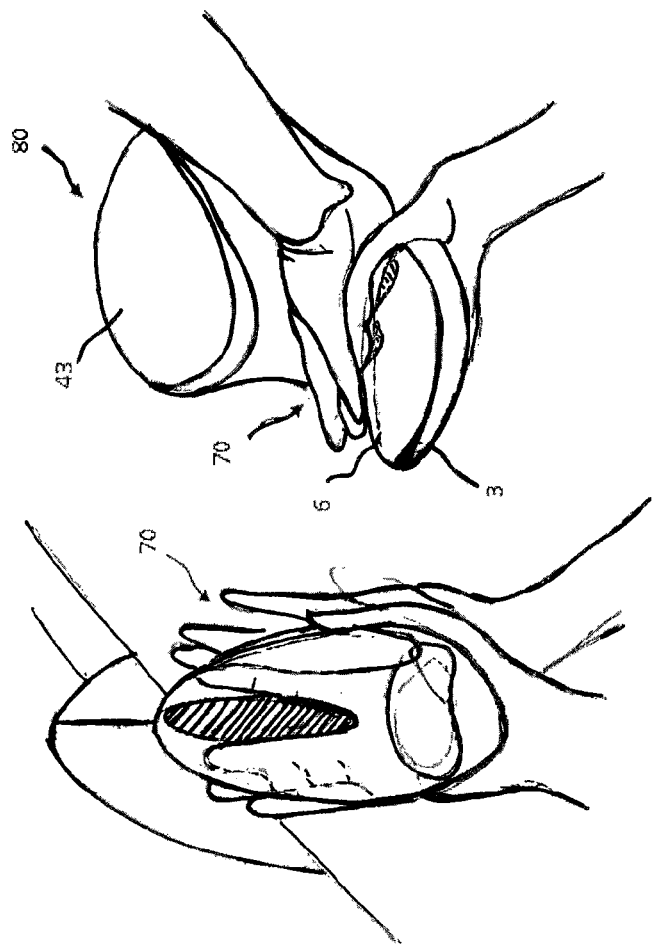
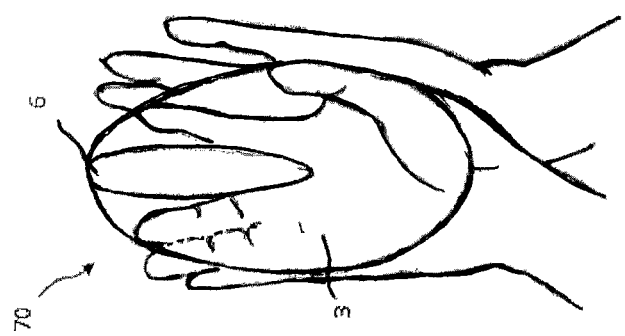
FIG.9A  FIG.9B  FIG.9C

SWIMMING ASSISTANCE ACCESSORY, ESPECIALLY FOR PERFORMING A STROKE REQUIRING AN UNDULATORY MOVEMENT

CROSS REFERENCE TO RELATED APPLICATIONS

This application is the U.S. National Stage of PCT/FR2013/052819, filed Nov. 21, 2013, which in turn claims priority to French Patent Application No. 1261087 filed Nov. 21, 2012, the entire contents of all applications are incorporated herein by reference in their entireties.

FIELD

The field of the invention relates to swimming assistance accessories. In particular, the invention relates to the equipments enabling to learn or perfect an undulatory simultaneous stroke such as the butterfly, dolphin or breast stroke. The field of the invention also relates to swimming assistance accessory for more experienced swimmers looking for an accessory for stabilizing at a depth in order to avoid the resistance of the "wave drag".

STATE OF THE ART

There are numerous swimming assistance accessories that can be commonly found in swimming pools or by the sea.

Among these accessories, there is the swimming pool swimming board, also referred to as kickboard, which enables to assist a swimmer by providing him/her a stability of the upper part of his/her body. This accessory enables the swimmer to focus on the lower part of his/her body in order to locally progress. Thus, the swimmer can learn how to kick his/her feet or to carry out the frog-like movements according to the practiced stroked without having to worry about the upper part of his/her body.

Besides, there are buoys adapted to the inner shape of legs, also called pull-buoys, such that the swimmer must press them in order to hold them in contact. Generally, they have an "8" shape enabling a good hold between the legs. Unlike the previous accessory, this accessory enables the stroke efforts to be concentrated on the upper part of the body. Another alternative consists in the assembly of two cylinders linked by a strap.

A third equipment, referred to as pull kick, is an "8"-shaped board. This board is designed to be inserted between the legs and enables a better hold between the legs. Being more rigid than the conventional "board", it also enables an underwater glide at the start of the heats and at turns.

In a stroke learning approach, an accessory can be used in order to concentrate the attention and the stroke efforts on a particular part. This learning requires the movements of a body part to be constrained by providing a stability gain against the movement created during the stroke by the non-blocked part of the body.

Besides, there are swimming assistance accessories which do not aim at blocking a movement of a body part. This is the case of swim fins, and paddles which enable the efforts to be concentrated on the lower part of the body so as to enhance the feelings thereof for the swimmer. Thus, the swimmer can learn how to kick his/her feet/legs according to a greater scale of kicking feelings. This accessory is useful for learning a stroke such as the front crawl but its feature is to amplify the movements of a body part. Therefore, it helps creating a dissymmetry of efforts distribution, which is the desired effect.

On the other hand, there is no swimming accessory for a stroke based on the swimmer's body undulation such as the butterfly stroke which involves an undulatory movement of the body.

The swimming assistance accessories for the breast stroke make it possible to work locally on a gesture. On the other hand, no accessory enables the improvement of the undulatory movement necessary to create a driving force and accompanying the swimmer's efforts.

Accessories such as previously described result in constraining the spreading of the body undulation especially to provide a stability gain.

The accessories previously described therefore seem incompatible for a swimmer desiring to improve the body undulation in water. Yet the latter is an essential parameter to be controlled when learning the butterfly stroke for example.

SUMMARY OF THE INVENTION

The invention enables the abovementioned drawbacks to be overcome.

The invention provides an accessory enabling strokes based on the swimmer's body undulation to be learned. It also provides a stability and guiding element without however stopping the body's undulation. It enables the undulation feelings to be improved.

The object of the invention relates to a swimming assistance accessory comprising:
- means for holding the accessory during the stroke;
- a float enabling water to exert, on the accessory, a vertical force resulting from the buoyant force opposed to gravity;
- a ballast for holding the barycenter of the holding means substantially under the water surface when the accessory is in a balance position in water.

The accessory makes it possible to:
- truly feel the importance of the undulations, the synchronization and the fluidity of the movement of the undulated stroke;
- feel the rhythm, flexibility and relaxation;
- feel a stroke with the whole body which must undulate, rather than forcedly advance with the arms and legs;
- remain longer in push-off by limiting the energy losses caused by the movements of the arms;
- swim under water in order to limit the hydrodynamic resistances such as the wave drag at the maximum.

According to an improved embodiment, the center of gravity of the ballast and the barycenter of the holding means are substantially close. They can also be merged.

The advantage is as follows
- the whole body is used and driven in the undulation facilitated by the accessory and not only the legs;
- the undulations especially of the pelvis are required without limiting the movements of the upper body.

According to an embodiment, the ballast is fully immersed in the balance position.

According to an embodiment, the balance position of the accessory corresponds to a barycenter position of the holding means between 1 and 50 cm under the water level.

In order to further improve these parameters, the balance position of the accessory corresponds to a barycenter position of the holding means between 15 and 60 cm under the water level.

Finally, the center of gravity of the accessory can be selected substantially close to the center of gravity of the holding means.

Means for adjusting the position of the ballast and/or the weight of the ballast enable the balance position of the accessory to be adjusted.

According to an embodiment of the invention, the accessory comprises a body for fixing the float and the ballast.

According to embodiments that can cooperate with each other:
- the body of the accessory has a compartment able to receive and hold a ballast in a fixed position. The compartment can be adapted to receive different dimension ballasts.
- The body comprises the holding means.
- The holding means are molded in the accessory's body.
- The holding means of the accessory are merged with the ballast.
- The float extends along a vertical axis.
- The accessory comprises a leading edge such as a hydrodynamic section for example.

Advantageously, when the accessory is subjected to the force of a swimmer tending to gradually immerse it while ensuring a horizontal movement, a restoring force is created by the float so as to accompany the vertical undulation of the swimmer's body in his/her horizontal movement.

Advantageously, the vertical plane comprising the center of gravity of the ballast is substantially merged with the vertical plane comprising the barycenter of the holding means, the vertical planes being oriented in the swimming direction.

Advantageously, the vertical axis comprising the center of gravity of the ballast is substantially merged with the vertical axis comprising the barycenter of the holding means.

Advantageously, the vertical axis comprising the barycenter of the holding means is substantially merged with the vertical axis comprising the barycenter of the float.

Advantageously, the holding means are adapted to a two-handed grip, both hands being partly overlapped.

Advantageously, the holding means are adapted to a two-handed grip, both hands being in an arrow type position.

Another object of the invention relates to a swimming assistance accessory also described with reference to FIGS. 8A, 8B, 9A, 9B, 9C and 10 wherein the lower part does not comprise a ballast.

The accessory comprises:
- a body forming a lower part of the accessory designed to be immersed during the stroke;
- means for holding the accessory adapted to a swimmer's two-handed grip, both hands being designed to partly overlap, the holding means extending on the upper part of the body, said upper part of the body forming a leaning area;
- a float enabling water to exert, on the accessory, a vertical force resulting from the buoyant force opposed to gravity.

Another object of the invention relates to a swimming assistance system comprising a swimming accessory such as previously described and further comprising a ballast belt enabling the swimmer to keep the balance position of the accessory when he/she holds it at his/her arm's length.

One advantage lies in enabling the assembly formed by the "swimmer fitted with a belt and an accessory" to be held at a substantially constant depth close to the balance position.

For this reason, the head and the arms are not sunk more than the rest of the body in the balance position.

This arrangement is suitable for a stroke centered on the hydrodynamic performance, especially if the swimmer, fitted with a snorkel, does not have to regularly resurface in order to breathe.

BRIEF DESCRIPTION OF THE FIGURES

Further characteristics and advantages of the invention will appear upon reading the following detailed description, with reference to the accompanying figures which illustrate:

FIGS. 4A, 4B, 4C: different positions of the swimmer during the undulation formed by his stroke;

FIGS. 9A, 9B, 9C: an illustration of the arrow type grip with the embodiment of FIGS. 8A, 8B, and 10.

DESCRIPTION

In the description hereinafter, the position in water in which the accessory lies when it is subjected to the only forces resulting from gravity and buoyant force is referred to as the balance position or balance of the accessory. A balance position can be defined by the depth expressed in cm under the water level at which the barycenter of the holding means lies. According to another approach, the balance position can be defined by the depth of the center of gravity of the ballast.

Figure 1A:
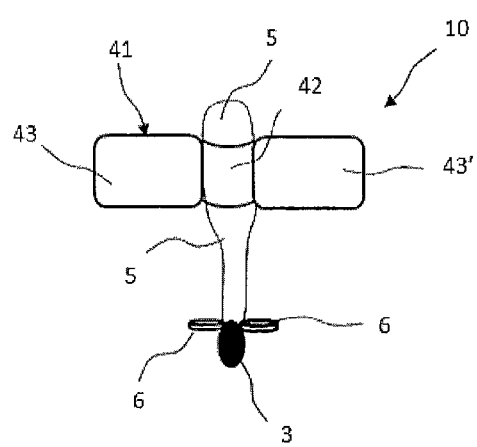
FIGS. 1A, 1B: two alternatives of a first embodiment of a swimming accessory according to the invention.
Figure 1B:
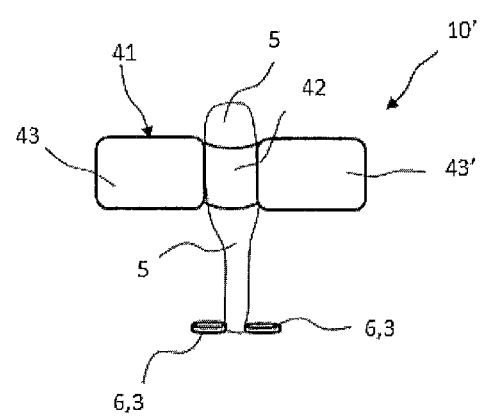

FIGS. 1A and 1B represent a first embodiment of a swimming assistance accessory 10, 10'.

FIG. 1A represents a first alternative 10 of the first embodiment. The accessory 10 comprises a body 5, a float 41, holding means such as handles 6, a ballast 3.

The swimming accessory 10 is arranged for a swimmer to be able to grab said accessory at two handles 6. The ballast and the holding means are located on a lower part of the accessory designed to be immersed during the stroke. The body 5 extends vertically. In the upper part of the accessory 10, a float is held by a cylindrical part 42 surrounding the body. Two floats 43 extend on either side of the body.

The floating element 41 can be replaced by gliding on the body 5 towards its upper end. This enables for example the float 41 to be adapted to the stroke context and the swimmer's build.

The ballast 3 is a weight designed to be immersed in use and enables the accessory to be balanced in order to be held at a balance at a distance close to the water level. The ballast 3 can be adjusted with a weight enabling an optimum balance point to be defined.

In a not shown alternative, the body 5 comprises a ballast in its lower part so as to form a same entity. In this instance, the ballast can be defined by a solid part of the body 5 which lengthens a hollow part in its upper part. According to another alternative, the body 5 can be assembled into two parts by molding or mechanical assembly. A lower part comprises the ballast 3 and an upper part is for fixing a float 41.

Figure 3A:
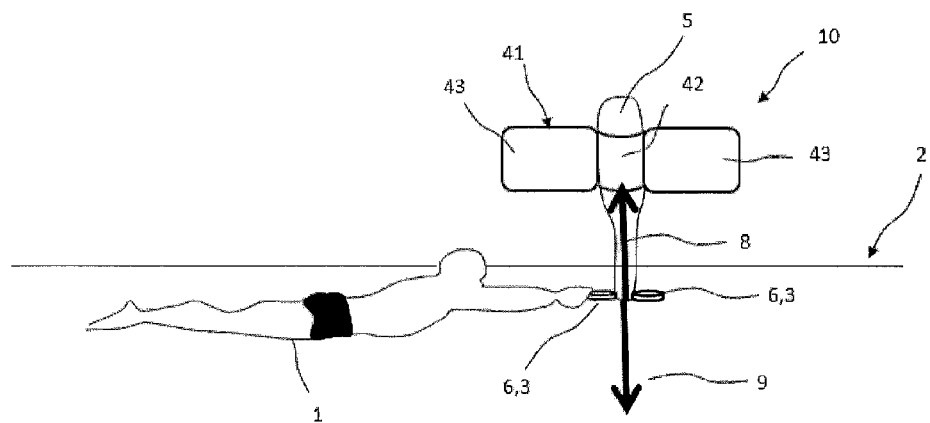
FIGS. 3A, 3B: two uses of two alternative embodiments of the accessory illustrating the present forces.

An optimum balance point corresponds to the position of FIG. 3A, when the swimmer laying at the water surface has his head intersecting the water line and his arms and hands located under water at a shallow depth.

FIG. 1B represents a second alternative embodiment 10' wherein the ballast 3 is integrated to the holding means 6. To make such an accessory, handles of a high density material can be chosen. The ballast 3 and the holding means 5 can form only one entity.

Figures 2A, 2B:
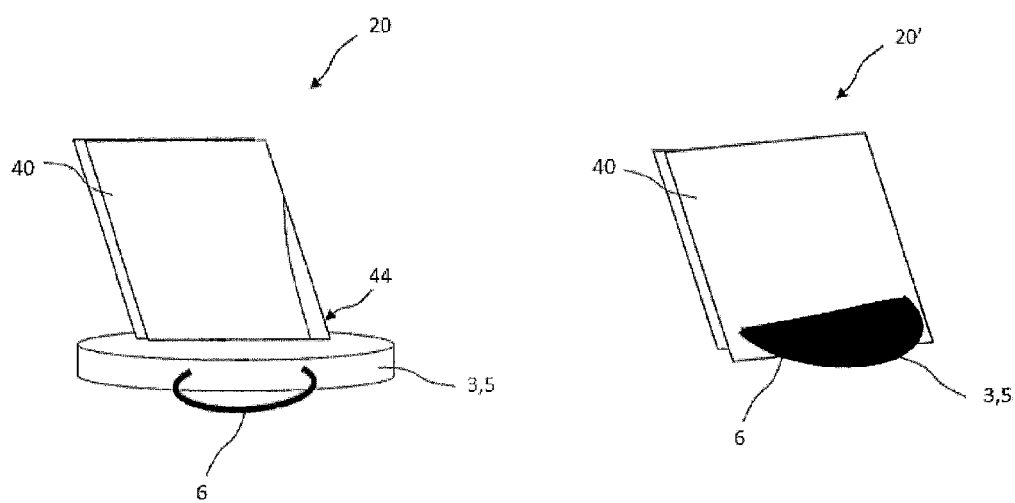
FIGS. 2A, 2B: two alternatives of a second embodiment of a swimming accessory according to the invention.

FIGS. 2A and 2B represent a second embodiment of a swimming assistance accessory 20, 20'.

FIG. 2A represents a first alternative 20 of the second embodiment. The accessory 20 comprises a float 40, holding means such as handles 6, a ballast 3, and a body 5.

In this embodiment, the body 5 and the ballast 3 form a single entity 3, 5. The float 40 is made as a vertically held board. The board 40 can comprise a leading edge 44 to improve the flow on either side of the accessory during the stroke.

According to the profile of the body 5 or the ballast 3, a leading edge can also be provided on one of both elements.

A trailing edge can also be made on the body or the float or even the ballast. An NACA type profile can be used for example.

FIG. 2B represents a second alternative 20' of the second embodiment. In this alternative, the float 40 has a compartment for insert the ballast 3 therein. The float can be bored to introduce the ballast, for example a "slot" type hole makes it possible to hold the ballast 3. In this alternative, the ballast has a shape enabling a grip on either side of the board 40. In this case, the holding means and the ballast make up the same piece, i.e. the same entity comprising both functions.

In the example of FIG. 2B, the ballast can have a disk shape. According to alternative embodiments, the shape is substantially a disk with a part forming a grip to enable the swimmer to hold the accessory and another diametrically opposed part which forms a leading edge on either side of the board so as to facilitate the water flow around the accessory.

The float 40 can be advantageously of expanded or foamed polymer, such as expanded polystyrene, polyurethane foam, polyethylene foam, etc. These materials enable on the one hand a good buoyancy and enable on the other hand a ballast 3 which would be inserted in a slot of the board to be held by physical contact and friction.

A swimmer can directly hold the accessory on the ballast 3. An advantage is that the grip of the accessory helps to hold the ballast in the float 40. According to the embodiment of FIG. 2B, the force which is exerted by the swimmer on the accessory during the stroke enables a force of the ballast 3 to be generated towards the inside of a slot edge, which helps to hold it in the slot.

FIG. 3A represents the accessory 10 according to the first alternative of the first embodiment when a swimmer holds it horizontally in water. The accessory thus held is subjected to two forces which enable to partially immerse it. A first force is exerted by the weight of the accessory and mainly of the ballast. This first force 9 is directed downward and does not depend on the immersion of the accessory; it opposes a second force which comes from the buoyant force. This second force is directed upwards and varies as a function of the depth of the accessory. The more the accessory is immersed, the more the buoyant force exerts a great force to make the accessory resurface 2. If the accessory is close to the surface 2, the resultant of the forces has the same direction as gravity, driving the accessory downwards. Conversely, when the accessory is nearly fully immersed, the resultant of the forces has the same direction as the buoyant force 8 and drives the accessory upwards.

The float 41 and the ballast 3 are thus selected so as to obtain a balance point just below the water level 2. The optimum balance point is obtained for the nominal position of a swimmer lying in water with his arms stretched out in front of him. This position according to the weight and the size of the swimmers is ideally between 10 and 60 cm deep. Optimum results in particular related to the maintenance of the undulation are obtained for a depth of 15 to 40 cm. At this balance point, the resultant of the forces 8 and 9 is zero.

Figure 3B:
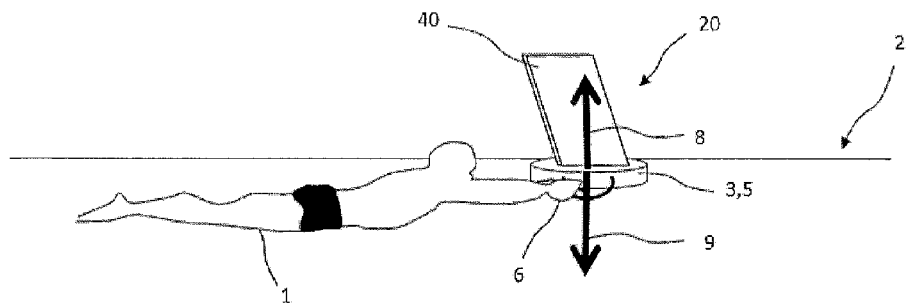

FIG. 3B represents a swimmer 1 with the accessory of the first alternative of the second embodiment described in FIG. 2A. In this case, both forces 9, 8 generated on the one hand by gravity and on the other hand by the buoyant force are also exerted on the accessory.

Each of both embodiments comprises an advantage. The first embodiment enables the swimmer's undulation to be more easily enhanced thanks to the shape of the float which enables the swimmer to resurface more easily when he goes down deep. The swimmer obtains a speed feeling during his resurfacing helping to generate a driving force. This force enables the swimmer to feel the spreading of the undulation in his body when he practices a stroke based on the body undulation.

In the second embodiment, the more streamlined profile enables the stroke speed to be improved and will be perhaps preferred by the more experienced swimmers.

FIGS. 4A, 4B, 4C are represented in order to better understand the effects provided by the accessory during an undulated stroke. Each figure represents a position P1, P2, and P3 respectively.

P1 represents the nominal position. Just after the initial position, the swimmer 1 starts to undulate by diving the accessory 10 under his balance position. The resultant of his movement's direction is represented by vector 21. First, the weight of the accessory ballast enables the feeling of the dive to be obtained and enhanced up to a certain depth. Then, just before arriving at position P2, the swimmer starts to feel the restoring force provoked by the increased buoyant force.

Position P2 represents the position in which the swimmer is when the holding means are substantially in the trough of the undulation 20, in the deepest position. In this position, the resultant of the buoyant force has a substantially maximum intensity regarding the position of the swimmer in his undulation and against gravity. It drives the swimmer towards the water surface by accompanying his resurfacing movement represented by vector 22. The buoyant force which is exerted on the accessory facilitates the progress of his undulation 20. The swimmer is nearly carried by the driving of the buoyant force which is reduced as he approaches the water surface. Then, the weight of the ballast 3 gradually slow down this resurfacing up to position P3.

Position P3 represents the case where the swimmer has nearly resurfaced, when the barycenter of the holding means of the accessory is at the highest point of the undulation 20; this point corresponds to the highest position in the undulation of the center of gravity of the ballast. In this position, the buoyant force is minimum since the body 5 and the float 10 are nearly totally out of the water. The weight of the ballast 3 is subjected to gravity against the buoyant force and drives the accessory towards the bottom. The force of gravity enables the swimmer 1 to come back along a direction 23 enabling him to continue his undulation 20. The swimmer can feel the cyclical sinusoidal movement of the undulation 20 which is enhanced by the accessory 10.

Figure 5:
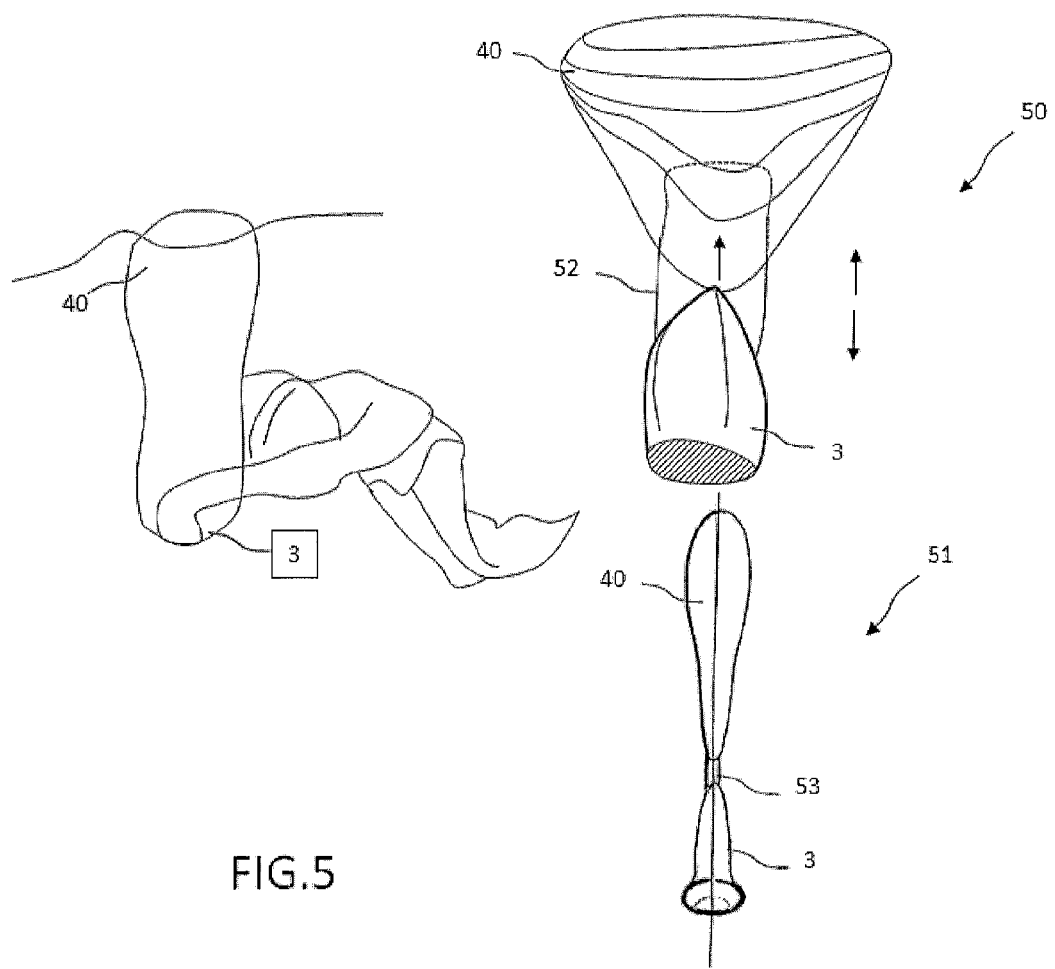
FIG. 5: two other embodiments according to the invention with means for adjusting the distance between the float and the ballast.

FIG. 5 represents another embodiment, in which the accessory 50 comprises a ballast 3 and a float 40. The body can, in this case, be the ballast 3. A rack 52 enables the distance between the ballast and the float to be adjusted. It is an adjusting means 52 for adjusting the center of gravity of the accessory and therefore the balance position in water of the accessory. These adjusting means enable the balance position to be adjusted at the desired distance under water as a function of the swimmer's build.

Another embodiment 51 is represented in FIG. 5. In this embodiment, a ring 53 slides along the float 40 on an area enabling the balance point to be substantially moved under water.

The accessory according to the invention enables a swimmer's aim to be reached which consists in adopting a quickest moving speed along a given distance while using the smallest quantity of metabolic energy. In this context, the energy coast of the movement appears as a decisive parameter of learning in the quest of performance.

An advantage of the swimming accessory according to the invention is that it enables the movements of a swimmer to be activated and accompanied through vertical shifting oscillations while aiming at improving the global undulating gesture and the associated energy expenditure.

Finally, FIG. 5 represents an embodiment in which the accessory can be advantageously used with a single swim fin thus forming a complete assistance system for a stroke based on an undulation of the swimmer's body. The combined effect of the single swim fin and the accessory enables the necessary oscillation feeling to be increased and represents an efficient system for learning such a stroke. The undulation effects being amplified at the upper body by the accessory and at the lower body by the single swim fin, a swimmer can feel the enhanced undulation throughout his body.

FIG. 5 also enables an embodiment to be defined wherein the accessory can comprise a hollow body having a first hollow upper part forming a float and a second hollow part distinct from the first part wherein a liquid such as water can be inserted. The second part can comprise an aperture for introducing liquid and a cap for closing the second part. An advantage of this embodiment is that the weight of the ballast can be adjusted according to the selected configuration. The selected configuration enables the balance point to be defined according to be desired oscillation and the swimmer's build.

According to another embodiment, the float can be an inflatable element which enables the position of the balance point to be adjusted according to the inflated volume.

Figure 6:
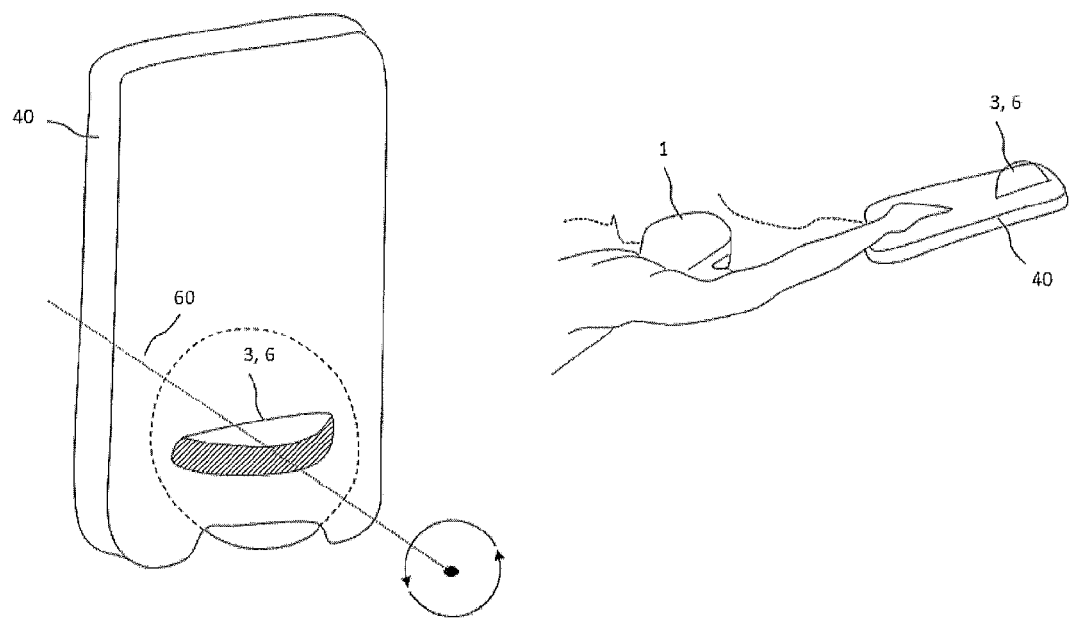
FIG. 6: an alternative embodiment enabling the holding means to be pivoted.

FIG. 6 represents an alternative embodiment in which the float 40, such as a board, has a compartment for fixing holding means 6 such as protrusions. The latter are for being grabbed on either side of the float by the swimmer 1. In this alternative, the ballast 3 can be either:
  integrated in the bottom part of the float forming a body integrated to the float, for example with a higher density; or
  integrated in the protrusion-forming handles 6.

This alternative presents a feature enabling the holding means to be pivoted around an axis 60 so as to enable the board 40 to be conventionally used as a swimming pool board.

When the holding means are pivoted, the drag provoked by the latter is minimum. Indeed, the board being used flat, the handles 6 form a ridge which besides enables a useful guiding element to be formed.

Figure 7:
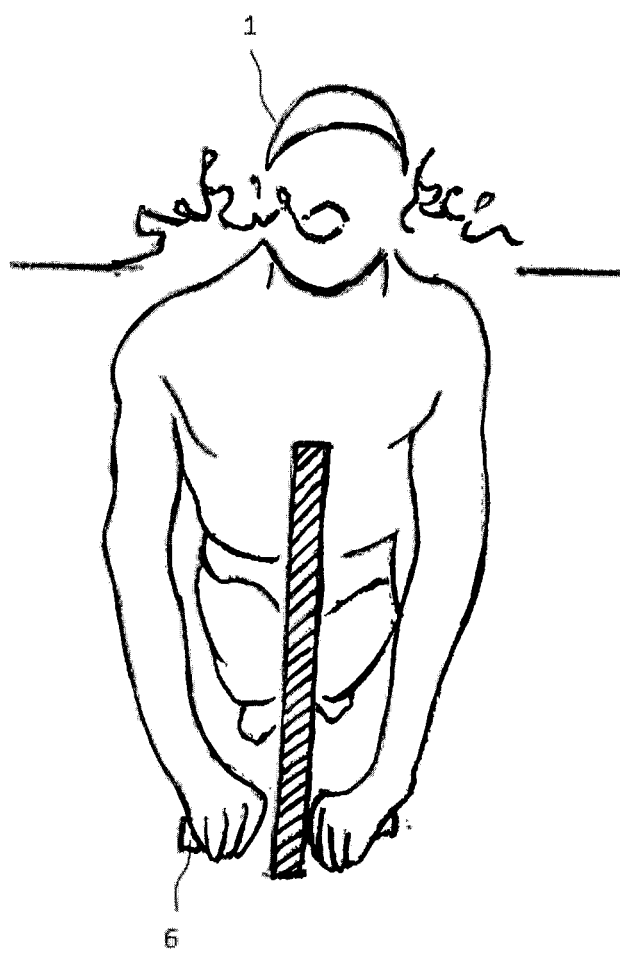
FIG. 7: an alternative embodiment comprising an oscillation limiting device.
Figure 8A:
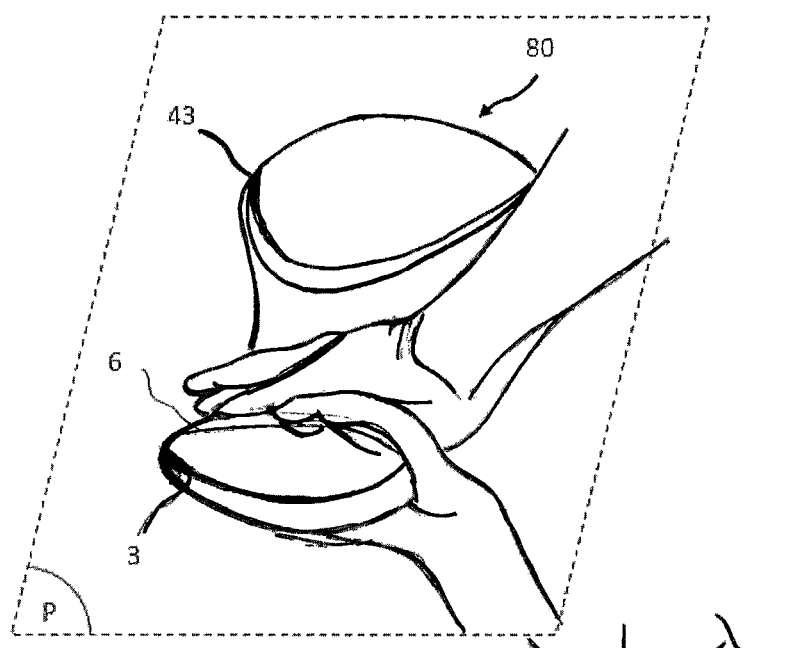
FIGS. 8A, 8B, 10: a compact embodiment of the accessory according to the invention.
Figure 8B:
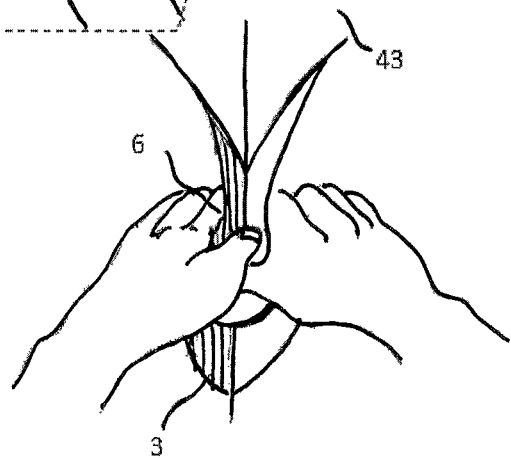
Figure 10:
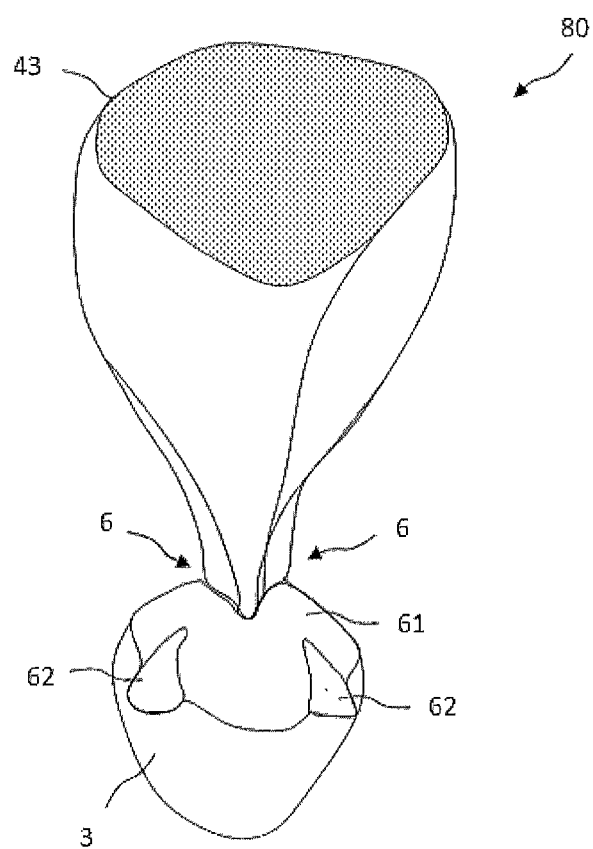

FIG. 7 represents an embodiment in which the accessory comprises an oscillation limiting device. In the example of FIG. 7, this device is formed by a surface integrated to the handles 6 such that the swimmer arriving at the undulation crest to breathe can lean against this surface to more easily resurface. A beneficial effect is to slow down the movement at this point, located at the undulation crest, when the swimmer leans on the holding means. If the swimmer does not lean, then the leaning surface cannot provide this effect, the decision is the swimmer's. The holding means can therefore comprise a profile oriented so as to minimize the drag during the undulation and optimize the generation of a leaning force when the swimmer stretches out his arms towards the bottom leaning on the handles.

According to an alternative embodiment, the oscillation limiting device can comprise a substantially horizontal leaning surface directly arranged on the float 50 for example at its upper end.

According to another alternative embodiment, this leaning surface can be directly arranged on the ballast.

The accessory enables a lesser effort to be made and the swimmer to be accompanied thanks to a floating device which converts and stores the swimmer's energy through an oscillating device. Furthermore, the aim of the accessory is to accompany or influence the cinematic of the stroke and to move at a controlled surface depth. This enables a swimmer's joints and tendons to be less used while enabling him/her to learn.

The accessory can thus comprise a first functionality related to a technical assistance and a second functionality related to a teaching assistance.

An additional effect felt by a swimmer using the accessory according to the invention is better swimming feelings obtained thanks to the obtained oscillation fluidity of his/her body and a certain relaxation to swim without having to struggle and without a contraction thanks to the driving effect provided by the accessory during the stroke.

The oscillating inertia of the device enables the muscular effort to be smoothed on a sinusoidal movement. The downward thrust force of the body weight will be converted into an upward thrust force by an action/reaction mechanism without the swimmer having to deploy many efforts.

Furthermore, during an undulated stroke, the oscillating inertia of the device enables, the sinusoidal movement to be smoothed and the "neutral time" to be reduced between both upward and downward phases.

According to the cases of use, the accessory comprises several advantages:
  used in open sea or on a beach, the accessory enables part of the oscillating energy of the swell to be recovered;
  coupled to a sail, the accessory can be used as a mechanical regulating tool.

A cyclical movement driven by both coexisting action-reaction forces around a balance point enables the energy supplied by a swimmer to be restituted in order to be used in a mode of resonance through the cyclical rising and lowering of a weight or a float.

The aim of the swimming accessory according to the invention is to keep the kinetic and potential forces and to minimize resistances to motion consequent to hydrodynamic frictions.

The accessory activated by a grip of the swimmer acts as a harmonic oscillator the evolution over time of which is described by an approximately sinusoidal function having a constant or adjustable amplitude.

According to an improved embodiment of the invention, the swimming accessory can be coupled to a ballast belt. The invention also relates to a system formed by the swimming accessory and the belt. The belt enables the buoyancy of the set formed by the accessory and the body to be balanced.

With a ballasted belt, the invention enables the swimmer to swim at a controlled depth in order to avoid the wave drag and its resistance.

The adjustments of the ballast or the float of the accessory can be carried out so as to take into account the use of a ballast belt or not and take into account the swimmer's body build, for example his/her weight. The adjustments will be actually different when the accessory is used for example by a child or an adult.

The oscillation amplitude of the device such as the depth of the cooperating area with the swimmer is adjustable with the weight of the ballast and the geometry or surface of the float.

The accessory according to the invention is particularly adapted to learn the butterfly or dolphin stroke. It is also adapted to learn the breaststroke in which the body undulation must be controlled.

The accessory further enables the swimmer's breathing to be improved during the stroke. The air return for inspiration is cyclically adjusted at a function of the apnea times selected or imposed by the swimmer. Inspiration is carried out by forcing the depth immersion of the device by a thrust of the arms. The leaning is carried out by an opposition of the arms action and the buoyant force reinforced to a lesser extent by the hydrodynamic lift.

The accessory can also be fixed around the waist like a belt, the float being positioned on the swimmer's back. Used in this way, the accessory enables the whole body to be freed while taking advantage of the assisted oscillation.

According to another use, the accessory can be used by being held between the legs to work on the muscular chains. This use enables the control of the pitch and roll to be facilitated.

Finally, the swimmer's undulation rhythm can follow the undulation frequency of the device. The latter can be adjusted by a variation of the weight of the float and of the distance between the weight and the float.

In the following part, FIGS. 8A, 8B, 9A, 9B, 9C, and 10 are used to describe an embodiment of the invention and are also used to describe another object of the invention relating to a swimming assistance accessory without a ballast.

According to an embodiment of the invention described with reference to FIGS. 8A, 8B, 9A, 9B, 9C, and 10, the swimming assistance accessory 80 can have a compact shape.

The holding means 6 enable the swimmer's hands to be received around a junction element of the float 43 and of the part comprising the ballast 3.

In this embodiment, the float has preferably a width lower than 40 cm. In this case, the accessory can be easily put in a bag, especially a swimming bag.

Advantageously, in the balance position of the accessory in water, the part of the holding means 6 forming the junction of the float 43 and the ballast 3 comprises a shaped leading edge enabling frictions with water to be reduced. In this embodiment, such as in all the embodiments of the invention, the lower part of the accessory comprising the ballast 3 is adapted to hold the barycenter of the holding means under the water surface when the accessory is in a balance position P1 in water and is vertically held if need be. In all the embodiments, the balance position of the accessory is defined when it is in a vertical position so as to obtain a reference point of the buoyancy level.

A first grip of the accessory according to the invention advantageously enables to grab the holding means with both hands, each thumb enabling a grasp of the holding mean while enabling the swimmer to keep a stable position.

A second grip 70 of the accessory according to the invention, called an "arrow type grip", advantageously enables a grasp of the accessory between the fingers of each hand, both hands overlapping each other during the stroke. This arrow type grip is particularly advantageous from a biomechanical point of view during the stroke to work on the swimmer's undulation. Indeed, the accessory is naturally held without the swimmer having to clutch the junction element. The swimmer's speed during the stroke naturally exerts a force on the junction between both fingers of each hand so as to hold the accessory between the swimmer's hands.

According to this embodiment, the upper part 61 of the part comprising the ballast 3 in an alternative can be substantially planar so as to form a support for the hands when they are positioned around the holding means 6.

According to another alternative which can be combined with this embodiment, the upper part 61 of the part comprising the ballast 3 can comprise notches 62 for receiving one or several fingers.

In this embodiment represented in FIGS. 8A, 8B, 9A, 9B, 9C and 10, the surface of the holding means extends to that of a shaped 3D volume so as to be adapted to a two-handed grip. The lower part comprising the ballast 3 can have an aerodynamic shape such as the shape of a small bar of soap or an upside-down mouse. The lower surface of the lower part comprising the ballast 3 can be slightly bulging so as to promote a flow at its surface.

Thus in this embodiment, the holding means 6 comprise a part of the junction between the ballast 3 and the float 43 and a side part of the part comprising the ballast 3 on either side of the junction.

According to all the embodiments of the invention, the balance position of the accessory can be defined with respect to a vertical plane P perpendicular to the plane of the surface of the body of water, especially when the accessory is used.

A feature common to all the embodiments of the invention with reference to all the figures is that the plane P forming a vertical plane of symmetry of the accessory comprises the center of gravity of the accessory and the center of gravity of the ballast 3. Furthermore, this same plane P comprises the barycenter of the accessory and the barycenter of the holding means 6, as well as the barycenter of the holding means 6 and the barycenter of the float 43.

In this embodiment as in all the embodiments, the vertical axis passing through the barycenter of the holding means is substantially identical to the vertical axis passing through the center of gravity of the ballast. It can also be noted that the vertical axis passing through the barycenter of the holding means is substantially identical to the vertical axis passing through the barycenter of the float.

Thus, the swimming assistance accessory in the latter embodiment comes as a compact element. In all the embodiments, the swimming assistance accessory has verticality properties enabling the swimmer to be stabilized during the stroke.

Another object of the invention relates to a swimming assistance accessory also described with reference to FIGS. 8A, 8B, 9A, 9B, 9C, and 10 wherein the lower part does not comprise a ballast.

The accessory comprises:
a body forming a lower part of the accessory designed to be immersed during the stroke;

means for holding the accessory adapted to a two-handed grip by a swimmer, both hands being designed to be partly overlapped, the holding means extending on the body upper part, said body upper part 3 forming a leaning area;

a float enabling water to exert, on the accessory, a vertical force resulting from the buoyant force opposed to gravity.

In this embodiment, the means for holding 6 the accessory are adapted to an arrow type grip of both swimmer's hands. A part of the holding means forms a junction between the body 3 and the float 43 and is designed to be positioned between at least two fingers of the swimmer. In this object, the lower part is designated on the same figures by the notation 3 which designated in the previous embodiment the ballast or the lower part comprising the ballast.

The part of the holding means forming a junction between the float 43 and the lower part 3 is shaped so as to have a thickness adapted to be introduced between at least two fingers during the stroke. Namely a target thickness is lower than 5 cm. Preferably, the width of the junction receiving the hands is lower than 3 cm.

Advantageously this object can be integrally made. It is therefore compact.

An advantage is to enable the swimming assistance accessory 80 to be held while providing a profile facilitating the flow of water on either side of the accessory.

This object can be combined with all the previously described alternatives with respect to FIGS. 1A, 1B, 2A, 2B, 3A, 3B, 4A, 4B, 4C, 5, 6, and 7 which are compatible with the swimming assistance accessory not comprising a ballast. Especially, the centers of gravity of the accessory, of the holding means, of the float and of the lower part are comprised in a same first vertical plane. Furthermore, the barycenters of the accessory, of the holding means, of the float and of the lower part are also comprised in a same second vertical plane. These first and second planes are preferably merged.

The invention claimed is:

1. A swimming assistance accessory, comprising:
    a holder configured to hold the accessory during a stroke adapted to a two-handed grip;
    a float enabling water to exert, on the accessory, a vertical force resulting from a buoyant force opposed to gravity;
    a body comprising a ballast for holding a barycenter of the holder substantially under the water surface when the accessory is in a balance position in water,
    wherein the holder forms a junction between the body and the float, an upper part of the body comprising the ballast forming a leaning area for swimmer's hands, and
    wherein a plane forming a vertical plane of symmetry of the accessory comprises a center of gravity of the accessory and a center of gravity of the ballast.

2. The swimming assistance accessory according to claim 1, wherein a center of gravity of the ballast and the barycenter of the holder are substantially close to each other.

3. The swimming assistance accessory according to claim 1, wherein the ballast is fully immersed in the balance position.

4. The swimming assistance accessory according to claim 1, wherein the balance position of the accessory corresponds to a barycenter position of the holder between 1 and 60 cm under the water level.

5. The swimming assistance accessory according to claim 1, wherein a center of gravity of the accessory is substantially close to a center of gravity of the holder.

6. The swimming assistance accessory according to claim 1, further comprising a leading edge.

7. The swimming assistance accessory according to claim 1, further comprising another body for fixing the float and the ballast.

8. The swimming assistance accessory according to claim 1, further comprising a compartment to hold the ballast in a fixed position.

9. The swimming assistance accessory according to claim 1, wherein when the accessory is subjected to a force of the swimmer tending to gradually immerse it while ensuring a horizontal movement, a restoring force is created by the float so as to accompany an undulation of the swimmer's body in his/her horizontal movement.

10. The swimming assistance accessory according to claim 1, wherein the vertical plane comprising the center of gravity of the ballast is substantially merged with a vertical plane comprising the barycenter of the holder, the vertical planes being oriented in a swimming direction.

11. The swimming assistance accessory according to claim 1, wherein a vertical axis comprising the center of gravity of the ballast is substantially merged with a vertical axis comprising the barycenter of the holder.

12. The swimming assistance accessory according to claim 1, wherein a vertical axis comprising the barycenter of the holder is substantially merged with a vertical axis comprising a barycenter of the float.

13. The swimming assistance accessory according to claim 1, wherein the holder is adapted to a two-handed grip, both hands being partly overlapped.

14. The swimming assistance accessory according to claim 1, wherein the holder is adapted to a two-handed grip, both hands being in an arrow type position.

15. The swimming assistance accessory according to claim 1, wherein the vertical plane comprises a barycenter of the accessory, the barycenter of the holder and a barycenter of the float.

16. A swimming assistance accessory according to claim 1, comprising:
    a holder configured to hold the accessory during a stroke adapted to a two-handed grip;
    a float enabling water to exert, on the accessory, a vertical force resulting from a buoyant force opposed to gravity;
    a body comprising a ballast for holding a barycenter of the holder substantially under the water surface when the accessory is in a balance position in water,
    wherein the holder forms a junction between the body and the float, an upper part of the body comprising the ballast forming a leaning area for swimmer's hands, and
    an adjusting mechanism to adjust the position of the ballast and/or the float so as to enable the balance position of the accessory to be adjusted under the water line.

17. A swimming assistance accessory, comprising:
    a body forming a lower part of the accessory designed to be immersed during a stroke;
    a holder configured to hold the accessory adapted to a swimmer's two-handed grip, both hands to be partly overlapped, the holder extending on an upper part of the body, said upper part of the body forming a leaning area;

a float enabling water to exert, on the accessory, a vertical force resulting from the buoyant force opposed to gravity, and wherein a plane forming a vertical plane of symmetry of the accessory comprises a center of gravity of the accessory and a center of gravity of the ballast.

18. The swimming assistance accessory according to claim 17, wherein the holder configured to hold the accessory is adapted to an arrow type grip by both swimmer's hands, part of the holder forming a junction between the body and the float and being configured to be positioned between at least two fingers of the swimmer.

19. The swimming assistance accessory according to claim 17, wherein the vertical plane comprises a barycenter of the accessory, the barycenter of the holder and a barycenter of the float.

20. A swimming assistance system comprising
a swimming assistance accessory comprising
  a holder configured to hold the accessory during a stroke adapted to a two-handed grip;
  a float enabling water to exert, on the accessory, a vertical force resulting from a buoyant force opposed to gravity;
  a body comprising a ballast for holding a barycenter of the holder substantially under the water surface when the accessory is in a balance position in water,
wherein the holder forms a junction between the body and the float, an upper part of the body comprising the ballast forming a leaning area for swimmer's hands, and
a ballast belt enabling the swimmer to keep the balance position of the accessory when he/she holds it at his/her arm's length.

* * * * *